United States Patent Office 3,702,335
Patented Nov. 7, 1972

3,702,335
THIOESTERS OF STEROIDS
Claude Lafille, Bretteville, sur Oron, France, assignor to Etablissements Clin-Byla, Paris, France
No Drawing. Filed Feb. 8, 1971, Ser. No. 113,768
Claims priority, application France, Feb. 11, 1970, 4,784
Int. Cl. C07c 169/32
U.S. Cl. 260—397.45                10 Claims

ABSTRACT OF THE DISCLOSURE

Prednisolone and dexamethasone derivatives are provided, in which the 21-position carries a carboxyl group derived from a thionated amino acid, such as methionine or cysteine, in which the amino group is connected to a protective group such as the benzyloxycarbonyl group or the acetyl group and/or the sulphur atom is attached to a methyl radical or to a protective group, e.g. the benzyloxycarbonyl group or the benzyl group. The compounds have local anti-inflammatory action.

The invention relates to the products defined by the following formula:

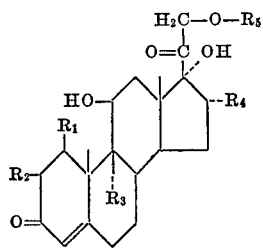

wherein $R_1$ and $R_2$ denote each a hydrogen atom or together form a double bond,
$R_3$ represents a hydrogen atom or a fluorine atom,
$R_4$ represents a hydrogen atom or a methyl group,
$R_5$ denotes the acyl radical derived from a sulfur-containing amino acid such as methionine or cysteine in which the amino group is connected to a protective group such as the benzyloxycarbonyl group or the acetyl group and the sulphur atom is attached to a methyl radical or to a protective group, in particular the benzyloxycarbonyl group or the benzyl group.

Applied locally, these products have a very interesting anti-inflammatory action which is generally greatly superior to that of the anti-inflammatory steroids from which they are derived.

The invention also relates to a process for the preparation of the compounds defined above, which process is an application of the method of W. T. Moreland (Journal of Organic Chemistry, 1956, 21, 820; Shunsaku Noguchi, Yakugaku Zasshi, 1961, 81, 373).

According to this process, the sulfur-containing amino acid $R_5$—OH in which $R_5$ has the meaning indicated above is reacted with the 21-iodo-alcohol, which is represented by the following formula:

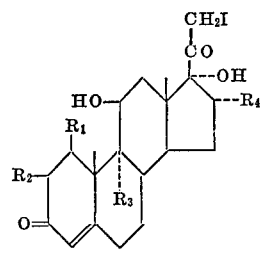

The esterification reaction may be carried out in the presence of a hydriodic acid acceptor, in particular triethylamine, preferably using dimethylformamide as diluent instead of acetone which is the diluent customarily employed.

The amino acid $R_5$—OH which has a blocked amine function and a blocked thiol function may be prepared by the process described by Stephan Goldschmidt and Christian Jutz in Chemische Berichte, 1953, 86, 1116, or the process described by Wood and Du Vigneaud in Journal of Biological Chemistry, 1939, 130, 110.

The required sterol ester may be isolated by adding a diluent such as ethyl acetate or methylene chloride to the reaction medium, washing the organic solution several times with water to remove dimethylformamide, drying with sodium sulphate and evaporating the diluent. The compound obtained as residue may be purified either by crystallisation in a solvent such as isopropanol or by dissolving in a hydrocarbon such as benzene and then precipitating with petroleum ether, this operation being preceded, if indicated, by chromatography.

The products are obtained in the form of white powder and are found to be chromatographically pure. The melting points are not entirely characteristic of purity, melting being preceded by softening. They are, however, mentioned in the examples by way of indication.

The IR spectra correspond to the structures mentioned above and in particular they show a wide band between 1500 and 1550 cm.$^{-1}$ for the compounds dispersed in KBr, which may be attributed to the amide II band.

The NMR spectra are in accordance with the structures indicated.

Preparation of the 21-iodo derivatives may be carried out, according to the processes described above, in two stages starting from sterols which have an alcoholic function at 21: first the action of para-toluenesulphonic acid chloride in dimethylformamide to provide a quantitative yield of the chlorine derivative, and then the action of sodium iodide in acetone to produce the required iodo derivative.

To obtain the said iodo derivative, the methanesulphonate of the steroid alcohol may be used instead of its chlorine derivative. The methane sulphonate may be obtained by reacting the required steroid alcohol with methanesulphonyl chloride in pyridine on a bath of ice.

The table below indicates by reference to the formula shown at the beginning the structure of typical compounds which constitute the object of the invention. It also refers to examples given hereinafter.

| Reference number | R₁ | R₂ | R₃ | R₄ | R₅ | Example number |
|---|---|---|---|---|---|---|
| 28001 | H | H | H | H | $-CO-CH\begin{smallmatrix}CH_2-CH_2-S-CH_3\\NH-CO-CH_3\end{smallmatrix}$ | 1 |
| 28006 | Represent an additional bond | | H | H | $-CO-CH\begin{smallmatrix}CH_2CH_2S-CH_3\\NH-CO-CH_3\end{smallmatrix}$ | 2 |
| 28017 | Represent an additional bond | | H | H | $-CO-CH\begin{smallmatrix}CH_2-CH_2-S-CH_3\\NH-COOCH_2-C_6H_5\end{smallmatrix}$ | 3 |
| 28018 | Represent an additional bond | | H | H | $-CO-CH\begin{smallmatrix}CH_2-S-COOCH_2-C_6H_5\\NH-COOCH_2C_6H_5\end{smallmatrix}$ | 4 |
| 28019 | Represent an additional bond | | H | H | $-CO-CH\begin{smallmatrix}CH_2S-CH_2-C_6H_5\\NH-COOCH_2-C_6H_5\end{smallmatrix}$ | 5 |
| 28007 | Represent an additional bond | | F | CH₃ | $-CO-CH\begin{smallmatrix}CH_2-CH_2-S-CH_3\\NH-COCH_3\end{smallmatrix}$ | 6 |
| 5394 | Represent an additional bond | | F | CH₃ | $-CO-CH\begin{smallmatrix}CH_2-CH_2-S-CH_3\\NH-COOCH_2-C_6H_5\end{smallmatrix}$ | 7 |
| 5395 | Represent an additional bond | | F | CH₃ | $-CO-CH\begin{smallmatrix}CH_2-S-COOCH_2-C_6H_5\\NH-COOCH_2-C_6H_5\end{smallmatrix}$ | 8 |
| 5396 | Represent an additional bond | | F | CH₃ | $-CO-CH\begin{smallmatrix}CH_2-S-CH_2-C_6H_5\\NH-CO-O-CH_2-C_6H_5\end{smallmatrix}$ | 9 |
| 5397 | Represent an additional bond | | F | CH₃ | $-CO-CH\begin{smallmatrix}CH_2-S-CO-O-CH_2-C_6H_5\\NH-CO-CH_3\end{smallmatrix}$ | 10 |
| 5398 | Represent an additional bond | | F | CH₃ | $-CO-CH\begin{smallmatrix}CH_2S-CH_2-C_6H_5\\NH-CO-CH_3\end{smallmatrix}$ | 11 |

In the examples which follow, the NMR spectra were obtained with a Varian A.60 apparatus, using a solution in deuteriochloroform with tetramethyl silane as internal reference.

The IR spectra were determined oodispersions in KBr.

A number of melting points were determined in a capillary tube; the other ones were determined on a block equipped with a microscope for observing melting.

EXAMPLE 1

17β-(5-acetylamino-1,4-dioxo-3-oxa-8-thianonyl)-17α, 11-β-dihydroxy-3-oxo-4-androstene (28,001 CB)

5 g. of 21-iodo hydrocortisone (0.0106 mol) and 6.07 g. of N1acetylmethionine (0.0318 mol) are dissolved in 50 cc. of anhydrous acetone. 9 cc. of triethylamine are added, the solution is maintained at 30° C. for 2 hours with stirring, and the acetone and excess triethylamine are driven off under vacuum. The viscous mass is taken up in 200 cc. of methylene chloride and the resulting solution is washed carefully three times with water and dried over sodium sulphate and the solvent is evaporated. The product is obtained in the crude state in the form of a white powder. The pure product is obtained by chromatography over silica gel (elution with benzeneethyl acetate) after evaporation of the solvent, dissolving the residue in benzene and precipitation in petroleum ether.

M.P.=108° C. to 110° C.

The NMR spectrum of the product shows four main peaks whose chemical displacement and intensity correspond to the groups CH₃ in S—CH₃ (2.1 p.p.m.); CH₃ in $$\overset{O}{\underset{\|}{C}}-CH_3$$

(2.0 p.p.m.); 18-methyl and 19-methyl (0.95 and 1.45 p.p.m.).

The infrared spectrum shows the following characteristic bands, among others: Amide II band in the region of 1530 cm.⁻¹ and C=O bands in the regions of 1645, 1715 and 1740 cm.⁻¹.

EXAMPLE 2

17-β-(5-acetylamino-1,4-dioxo-3-oxa-8-thianonyl)-17α, 11β-dihydroxy-3-oxo-androstadiene-1,4 (28,006 CB)

8.8 g. of 21-iodo-prednisolone and 10.75 g. of N-acetylmethionine are dissolved in 90 cc. of dimethylformamide, and 8.1 cc. of triethylamine are added. The solution is kept at 30° C. for 2 hours with stirring, 350 cc. of methylene chloride are added and the mixture is poured into 1.5 l. of water.

The product is obtained in the pure state after isolation and chromatography carried out by the method described in Example 1.

M.P.=116° C. to 117° C.

NMR spectrum: CH₃ in S—CH₃ (2.12 p.p.m.); CH₃ in

(2.01 p.p.m.); 18-methyl and 19-methyl (0.96 p.p.m. at 1.47 p.p.m.).

Infrared spectrum: amide II band in the region of 1530 cm.⁻¹; C=O bands in the regions of 1650 cm.⁻¹; 1715 cm.⁻¹ and 1740 cm.⁻¹.

EXAMPLE 3

17β - (5 - benzyloxy-carbonylamino - 1,4 - dioxo-3-oxa-8-thia) - 17α,11β - dihydroxy - 3 - oxo-androsta-1,4-diene (28,017 CB)

4.5 g. of 21-iodo prednisolone are dissolved in 20 cc. of dimethylformamide. 5 cc. of triethylamine and 3.38 g. (1.25 equivalents) of N-benzyloxy-carbonyl DL-methionine are added. This solution is maintained at 45° C. for one hour with stirring. The crude product is obtained by treating this solution with ethyl acetate, washing it successively with a dilute aqueous solution of hydrochloric acid, then sodium carbonate, then dilute bisulphite solution and finally water, drying and evaporation. This crude product is taken up in methanol and treated with charcoal decolorant. After filtration and evaporation of the methanol, the product is dissolved in the minimum of benzene and precipitated in petroleum ether.

M.P.=92° C. to 94° C.

The NMR spectrum shows five main peaks: 18-methyl and 19-methyl (0.95 p.p.m. and 1.46 p.p.m.); CH₃ in S—CH₃ 2.1 p.p.m.); CH₂ in C₆H₅—CH₂ (5.11 p.p.m.); C₆H₅ (7.33 p.p.m.).

EXAMPLE 4

17β-(5 - benzyloxy-carbonylamino - 10 - phenyl-1,4,8-trioxo-3,9-dioxa - 7 - thiadecyl)-17α,11β-dihydroxy-3-oxoandrosta-1,4-diene (28,018 CB)

The procedure carried out in Example 3 is employed, N-benzyloxycarbonyl DL-methionine being replaced by the stoichiometric quantity of N,S-dibenzyloxycarbonyl-L-cysteine.

M.P.=90° C. to 92° C.

NMR spectrum: C₆H₅ (7.3 p.p.m.); CH₂ in

—NH—COO—CH₂—C₆H₅

(5.2 p.p.m.); CH₂ in S—COO—CH₂—C₆H₅ (5.09 p.p.m.); 18-methyl and 19-methyl (1.45 p.p.m. and 0.95 p.p.m.).

EXAMPLE 5

17β - (5 - benzyloxy-carbonylamino-8-phenyl-1,4-dioxo-3-oxa - 7 - thia) - 11α,17β-dihydroxy-3-oxo-androsta-1,4-diene (28,019 CB)

The product is prepared by the method described in Example 3, N-benzyloxy-carbonyl DL-methionine being replaced by the stoichiometric quantity of N-benzyloxy-S-benzyl-L-cysteine.

M.P.=88°C. to 90° C.

The NMR spectrum shows inter alia six peaks which are characteristic of the following groups:

Two C₆H₅ groups: one at 7.33 p.p.m., the other at 7.28 p.p.m.;
—CH₂ in the COOCH₂—C₆H₅ chain at 5.11 p.p.m.;
—CH₂ in the S—CH₂—C₆H₅ chain at 3.75 p.p.m.;
18-methyl and 19-methyl at 1.45 p.p.m. and 0.92 p.p.m.

EXAMPLE 6

9-(5-acetylamino-1,4-dioxo-3-oxa-8-thia-nonyl) - 17α,11β-dihydroxy - 9α - fluoro-16α-methyl-3-oxoandrosta-1,4-diene (28,007 CB)

9.5 g. of 21-iodo dexamethasone and 17 g. of N-acetyl-methionine are dissolved in 100 cc. of dimethylformamide. 15 cc. of triethylamine are added. The solution is maintained at 40° C. for 2 hours with stirring, the residue is taken up in 400 cc. of ethyl acetate and the organic phase is carefully washed with carbonated water, then with a dilute solution of hydrochloric acid, then with a dilute solution of sodium bisulphite and finally with water. The product is dried over sodium sulphate and evaporated to dryness and the powder obtained is taken up with the minimum quantity of isopropanol and left to crystallise.

M.P.=125° C. to 127° C. (capillary).

NMR spectrum: CH₃ in S—CH₃ (2.1 p.p.m.) and in CO—CH₃ (2.03 p.p.m.).

IR spectrum: C=O complex band in the region of 1660 cm.⁻¹; wide C=O complex band at 1700 to 1760 cm.⁻¹; wide C=O amide II band in the region of 1540 cm.⁻¹.

EXAMPLE 7

17β - (5-benzyloxy-carbonylamino-1,4-dioxo-3-oxa-8-thia-nonyl) - 17α,11β - dihydroxy-9α-fluoro-16α-methyl-3-oxoandrosta-1,4-diene (5394 CB)

3 g. of 21-iodo dexamethasone and 2.1 g. of N-benzyloxycarbonyl DL-methionine are dissolved in 20 cc. of dimethylformamide. 5 cc. of triethylamine are added. After two hours stirring at 40° C., the product is isolated by the method described in Example 6.

M.P.=113° C. to 115° C. (capillary).

IR spectrum: Around 1530 cm.⁻¹ (amide II); conjugated CO in the region of 1650 cm.⁻¹; complex C=O bands around 1650 cm.⁻¹; and 1715 cm.⁻¹ with inflexion at 1750 cm.⁻¹.

EXAMPLE 8

17β - (5-benzyloxy-carbonylamino-10-phenyl-1,4,8-trioxo-3,9 - dioxa - 7-thia-decyl)-17α,11β-dihydroxy-9α-fluoro-16α-methyl-3-oxo-androsta-1,4-diene (5395 CB)

10 g. of 21-iodo dexamethasone and 9.4 g. of N,S-dibenzyloxycarbonyl L-cysteine are dissolved in 100 cc. of dimethylformamide. 12 cc. of triethylamine are added.

The reaction mixture is heated with stirring at 60° C. for 45 minutes. The product is isolated by the method described in Example 6.

M.P.=90° C. to 92° C. (capillary).

IR spectrum: Wide band around 1520 cm.⁻¹ (amide II): C=O complex bands around 1650 cm.⁻¹ and 1710 cm.⁻¹ with an inflexion in the region of 1750 cm.⁻¹.

EXAMPLE 9

17β - (5 - benzyloxy-carbonylamino-8-phenyl-1,4-dioxo-3-oxa - 7 - thia-octyl) - 17α,11β-dihydroxy-9α-fluoro-16α-methyl-3-oxo-androsta-1,4-diene (5396 CB)

3.5 g. of 21-iodo dexamethasone and 3.2 g. of N-benzyloxycarbonyl-S-benzyl-L-cysteine are dissolved in 35 cc. of dimethylformamide, 6 cc. of triethylamine are added, the reaction mixture is heated at 60° C. for one hour with stirring and the product is isolated by the method described in Example 6.

M.P.=142° C. to 143° C. (capillary).

IR spectrum: Wide band around 1520 cm.⁻¹; C=O complex bands around 1650, 1710 and 1750 cm.⁻¹.

EXAMPLE 10

17β - (5 - acetylamino-10-phenyl-1,4,8-trioxo-3,9-dioxa-7-thia - decyl) - 17α,11β-dihydroxy-9α-fluoro-16α-methyl-3-oxo-androsta-1,4-diene (5397 CB)

3.5 g. of 21-iodo dexamethasone and 2.7 g. of N-acetyl-S-benzyloxycarbonyl L-crysteine are dissolved in 35 cc. of dimethylformamide, 6 cc. of triethylamine are added, the reaction mixture is heated at 60° C. for one hour with stirring and the product is isolated as indicated in Example 6.

M.P.=125° C. to 128° C. (capillary).
IR spectrum: Wide band around 1530 cm.$^{-1}$; C=O complex bands around 1650, 1710 and 1740 cm.$^{-1}$.

In the table below, the results are expressed as percentage variation of the weights of treated granuloma with respect to the control granuloma as a function of

| Product | Dose of product deposited on each cotton pellet (in mg.) | | | | | | | | | | | |
|---|---|---|---|---|---|---|---|---|---|---|---|---|
| | 0.001 | 0.005 | 0.01 | 0.025 | 0.031 | 0.05 | 0.0625 | 0.1 | 0.125 | 0.25 | 0.50 | 1 |
| Derivatives of prednisolone: | | | | | | | | | | | | |
| 28 006 CB | | | | | | [1] −21.5 | | | | [1] −20.7 | [1] −40.7 | |
| 28 017 CB | | [1] −11 | [1] −26.6 | [1] −29.7 | | [1] −43.7 | | [1] −49.2 | [1] −52 | [1] −64 | [1] −44.4 | |
| 28 018 CB | | [1] −34.1 | [1] −41.4 | [1] −40.2 | | [1] −46.0 | | | [1] −61 | [1] −64.7 | [1] −57.5 | [1] −54 |
| 28 019 CB | | [1] −11.3 | [1] −35.4 | [1] −26.8 | | [1] −45.4 | | | [1] −47.7 | [1] −49.4 | [1] −69.5 | [1] −55 |
| Prednisolone | | | | | | [1] −19.5 | | | | [1] −17 | [1] −34.8 | |
| Derivatives of dexamethasone: | | | | | | | | | | | | |
| 28 007 CB | | | −20.2 | | | [1] −32.4 | | | | [1] −47.4 | | |
| 5 394 CB | +2.4 | −1.1 | | [1] −52.9 | | [1] −44.3 | | [1] −43.4 | | | | |
| 5 395 CB | [1] −22.5 | [1] −50 | | [1] −6.2 | | [1] −48.3 | | [1] −55.4 | | | | |
| 5 396 CB | −0.4 | [1] −30.2 | | [1] −63.8 | | [1] −51.6 | | [1] −53.1 | | | | |
| 5 397 CB | +2.4 | [1] −24.1 | | [1] −58.5 | | [1] −37.2 | | [1] −44.0 | | | | |
| 5 398 CB | +0.2 | [1] −26.6 | | [1] −44.9 | | [1] −27.6 | | [1] −33.8 | | | | |
| Dexamethaxone | +10.6 | [1] −35.5 | | [1] −34.8 | | [1] −18.8 | | [1] −34.9 | | [1] −61.1 | | |

[1] Statistically significant results.

EXAMPLE 11

17β-(5-acetylamino-8-phenyl-1,4-dioxo-3-oxa-7-thiaoctyl)-17α,11β - dihydroxy-9α-fluoro-16α-methyl-3-oxoandrosta-1,4-diene (5398 CB)

2.7 g. of 21-iodo dexamethasone and 1.7 g. of N-acetyl-S-benzyl-L-cysteine are dissolved in 25 cc. of dimethylformamide, 5 cc. of triethylamine are added, the reaction mixture is heated at 40° C. for two hours with stirring and the product is isolated by the method described in Example 6.

M.P.=95° C. to 97° C. (capillary).
IR spectrum: Wide band around 1540 cm.$^{-1}$; C=O complex bands around 1650, 1715 and 1740 cm.$^{-1}$.

The new compounds were investigated for their possible anti-inflammatory properties by local administration. The following tests were carried out:

(1) Influence on the development of the subcutaneous cotton granuloma in the rat studied by incorporating the product in the cotton pellet.

The local anti-inflammatory action of these derivatives was investigated by means of the experimental granuloma test (Hershberger and Calhoun, Endocrinology 1957, 60, 153).

This test consists in implanting under the skin of the rat, cotton pellets of equal weight impregnated with the product which is to be studied. The tests are carried out on the male rat of the Charles River strain having an average weight of 200 grams.

The animals are divided at random into batches of 10 and the pellets are then implanted under a light ether anaesthesia. Each rat is given two pellets in the dorsal region and two pellets in the pectoral region.

Impregnation of the pellets with the products to be studied was carried out as follows: The product is dissolved in dioxane and the concentration of this solution is varied so that the amount of product added in equal volumes to each batch of pellets varies from 0.001 mg. to 4 mg. per pellet. Before implantation, the pellets are placed in a drying oven to facilitate evaporation of the organic solvent.

For each product, experiments are carried out with several doses, each dose being administered to one batch of ten rats. Each test is combined with a test on a batch of ten control rats to whom similar cotton pellets impregnated with solvent alone and then evaporated are administered under the same conditions.

The animals are killed on the seventh day after implantation. The granuloma formed around the cotton pellets impregnated either with product or with solvent alone are removed. This granuloma are dried in an oven for 48 hours and then weighed.

The weights of the treated granuloma and the weight of the control granuloma are compared.

the dose of each product. The table is divided into two parts corresponding to the prednisolone derivatives and dexamethasone derivatives.

Thus, all the derivatives studied showed clear evidence of a local anti-inflammatory action.

Among the derivatives of prednisolone, 28,006 CB has an action substantially equal to that of prednisolone. The other three derivatives, 28,017, 28,018 and 28,019, are distinctly more active and the derivative 28,018 CB has the highest anti-inflammatory action.

The results obtained are found to be similar to those obtained with derivatives of dexamethasone. 5395 CB is found to be distinctly different from the other products. It is still highly active at 0.001 mg. and provides a sustained antagonistic action against the proliferation of granulation tissue.

(2) Local action against sulphuric acid necrosis in the rat.

The test was carried out on male rats of the Sherman strain which had been chemically epilated. Dorsal cutaneous necrosis was produced under a general anaesthesia by the application of 20% sulphuric acid for 90 seconds.

The product 5395 CB, which was the most highly active in the previous test, was incorporated in two doses in an anhydrous hydrophilic excipient ("polyethylene glycol ointment" of U.S.P. XVII). The treatment was applied by cutaneous message for two minutes every day for five days starting from the third day following necrosis. The cutaneous fold was measured each day.

| Product | Concentration in percent | Variation of fold from the beginning of treatment in percent |
|---|---|---|
| Anhydrous excipient | | +1 |
| Dexamethasone | 0.001 | −40 |
| 5395 CB | 0.001 | −47 |
| Dexamethasone | 0.003 | −54 |
| 5395 CB | 0.003 | −57 |

The difference in activity between 5395 CB and dexamethasone can be clearly seen at a low concentration (0.001%).

(3) Cutaneous penetration.

Transcutaneous penetration was studied in the male rat which had simply been shaved.

Sherman rat; healthy skin:

After shaving with clippers, a cream containing the substance to be studied was applied once each day for 5 days to the two flanks by massaging for exactly two minutes. The flanks were very carefully dried after each application. The excipient was the same as in the tests described above (PEG ointment USP XVII) and the concentration used was 0.1% (in dexamethasone).

The following criteria were chosen for penetration: Variation of the body weight, blood lymphocyte count/ mm.³, polynuclear/mononuclear ratio, each per mm.³, variation in the weight of the thymus and variation in the weight of the spleen.

The results for three of the compounds are summarized in the table below.

| Product | Δ, percent | | | Lymphocytes | | Neutrophil Δ, per cent [1] | Mononuclear lymphocytes | | | Ratio | |
|---|---|---|---|---|---|---|---|---|---|---|---|
| | Body weight | Thymus | Spleen | Polynuclear | | | | | | Poly, before treatment | Mono, after treatment |
| | | | | Before treatment | After treatment | | Before treatment | After treatment | Δ, per cent [1] | | |
| Excipient | +2.5 | (²) | (²) | 3,470 | 3,475 | +13 | 10,335 | 12,110 | +18.9 | 0.336 | 0.28 |
| Dexamethasone | −16.9 | −75.9 | −58.8 | 3,840 | 6,110 | +69.9 | 9,350 | 1,600 | −82.5 | 0.410 | 3.94 |
| 5395 | −15.7 | −73.5 | −56 | 2,965 | 5,490 | +102 | 9,740 | 1,964 | −79.5 | 0.304 | 2.80 |
| 5396 | −16.6 | −75.1 | −65.6 | 2,885 | 3,910 | +72.4 | 12,045 | 1,470 | −87.7 | 0.240 | 2.66 |
| 5397 | −18.5 | −75.1 | −57.9 | 2,715 | 2,965 | +10.5 | 10,155 | 886 | −91 | 0.267 | 3.35 |

[1] Mean value of individual variations. This value is thus different from the percent calculated on the basis of the mean value.
[2] Reference.

At the concentration and under the experimental conditions chosen, cutaneous penetration is found to be very high, which is in accordance with the characteristics of the skin of the rat, which has a very thin epidermis perforated by a very large number of hair follicles. At this relatively high concentration, little difference is found between the products. If, however, each product is classified according to the response obtained for each criterion of penetration the overall classification shown below is obtained, which indicates that 5395 CB has the least penetration, which favours a local anti-inflammatory action of long duration. The grading 1 is allotted in each case to the strongest action.

| Criterion of penetration | Grading of activity with respect to each criterion of penetration | | | | |
|---|---|---|---|---|---|
| | Excipient | Dexamethasone | 5395 CB | 5396 CB | 5397 CB |
| Body weight | 5 | 2 | 4 | 3 | 1 |
| Δ thymus | 5 | 1 | 4 | 2 | 2 |
| Δ spleen | 5 | 2 | 4 | 1 | 3 |
| Δ lymphocytes | 5 | 3 | 4 | 2 | 1 |
| Δ poly/mono | 5 | 1 | 3 | 4 | 2 |
| Total | 25 | 9 | 19 | 12 | 9 |

Sherman rat: Skin necrosis produced with sulphuric acid.

The experimental procedure is the same as indicated under 2. Penetration of the products through the skin necrosis could be assessed from the change in body weight and the change in the weight of the thymus and the weight of the spleen at the beginning of the treatment. The investigation was carried out on two products and at two concentrations.

Results:

| | Concentration in percent | Change in— | | |
|---|---|---|---|---|
| | | Body weight in percent | Thymus in percent | Spleen in percent |
| Anhydrous excipient | | +3.9 | −34 | −16.5 |
| Dexamethasone | 0.001 | −7.3 | −49 | −27.4 |
| 5395 CB | 0.001 | −1.2 | −34.9 | −7.8 |
| 5396 CB | 0.001 | 0 | −20.9 | −3.2 |
| Dexamethasone | 0.003 | −9.2 | −85 | −9.5 |
| 5395 CB | 0.003 | −8.1 | −86 | −12.5 |
| 5396 CB | 0.003 | −7.5 | −85 | −29 |

In conclusions, it may be said that as regards cutaneous penetration, compounds 5395 CB and 5396 CB have weaker general effects at a concentration of 0.001% than the other products used, indicating weaker penetration across the necrosed skin and hence a certain retention at that level.

At a higher concentration (0.003%), general penetration is very high and manifests itself, as in the case of dexamethasone, by a substantial involution of the thymus and of the spleen and a drop in body weight.

Thus, the new compounds, and particularly those of dexamethasone, have the anti-inflammatory action of the parent steroid derivative but their localized effects are more favourable and their general diffusion and hence their general secondary effects are more limited. The phenomenon is particularly noticeable in the case of 5395 CB.

5395 CB has a particularly high local specificity and may be used for the treatment of local inflammatory, allergic and other lesions for which local corticotherapy is indicated in man and animals. It may be administered in the form of ointment, cream, solution, emulsion, aerosol or implant or any other conventional form used for local application to the skin, mucous membranes or tissues.

Examples of suitable pharmaceutical compositions are given below.

Milk (viscosity 7.7 poises)

| | G. |
|---|---|
| 5395 CB | 0.262 |
| Cetomacrogol 1000 | 5 |
| Perhydrosqualene | 10 |
| Glycerol | 5 |
| Purified water q.s. for | 100 |

Cream (viscosity 35 poises)

| | G. |
|---|---|
| 5395 CB | 0.262 |
| Cetomacrogol 1000 | 10 |
| Perhydrosqualene | 7 |
| Glycerol | 7 |
| Purified water q.s. for | 100 |

Anhydrous ointment

| | G. |
|---|---|
| 5395 CB | 0.262 |
| Mixture of polyoxyethylene glycol 400 (4 parts by weight) with polyoxyethylene glycol 4000 (1 part by weight) q.s. for | 100 |

Anhydrous ointment

| | G. |
|---|---|
| 5395 CB | 0.262 |
| Trichlorocarbanilide | 0.200 |
| Same mixture of polyoxyethylene glycols 400 and 4000 as above, q.s. for | 100 |

Cetomacrogol 1000 is a polyethylene glycol 1000 monocethylether (British Pharmaceutical Codex 1968, p. 138.)

I claim:
1. Compounds having the following formula:

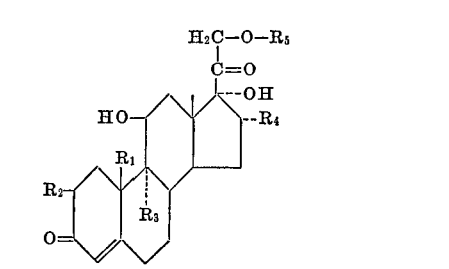

wherein

R₁ and R₂ denote each a hydrogen atom or together form a double bond;

R₃ represents a hydrogen atom or a fluorine atom;

R₄ represents a hydrogen or a methyl group;

R₅ represents the acyl radical of a sulfur-containing amino acid selected from the group consisting of methionine and cysteine wherein the amino group is attached to a moiety selected from the group consisting of benzyloxycarbonyl and acetyl with the proviso that when the acid is cysteine, the sulfur atom is attached to a benzyloxycarbonyl or benzyl group.

2. Compounds as claimed in claim 1 and having the following formula:

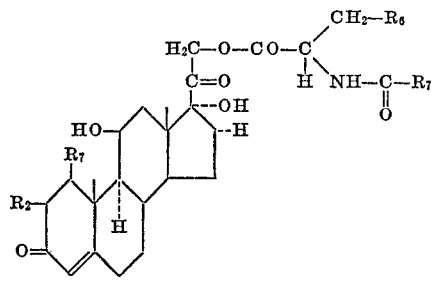

in which R₁ and R₂ denote each a hydrogen atom or together form a double bond, R₆ represents CH₂—S—CH₃, S—COO—CH₂—C₆H₅ or S—CH₂—C₆H₅ and R₇ represents CH₃ or O CH₂ C₆H₅.

3. Compounds as claimed in claim 2, wherein R₁ and R₂ are both hydrogen atoms.

4. Prednisolone derivatives as claimed in claim 1 and having the following formula:

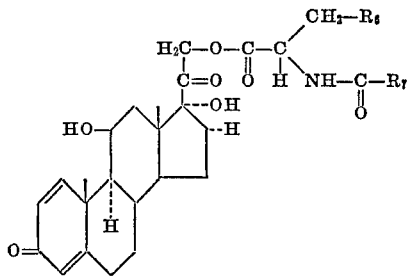

in which R₆ represents CH₂—S—CH₃,

S—COO—CH₂—C₆H₅ or S—CH₂—C₆H₅ and R₇ represents CH₃ or O CH₂ C₆H₅.

5. Compounds as claimed in claim 1 and having the following formula:

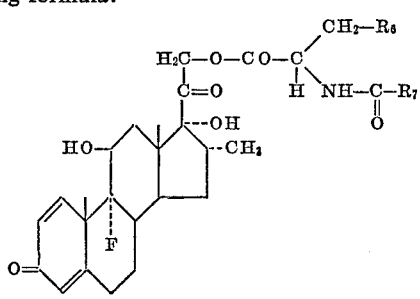

in which R₆ represents CH₂—S—CH₃,

S—COO—CH₂—C₆H₅ or S—CH₂C₆H₅ and R₇ represents CH₃ or OCH₂ C₆H₅.

6. A dexamethasone derivative as claimed in claim 1 which corresponds to the following formula:

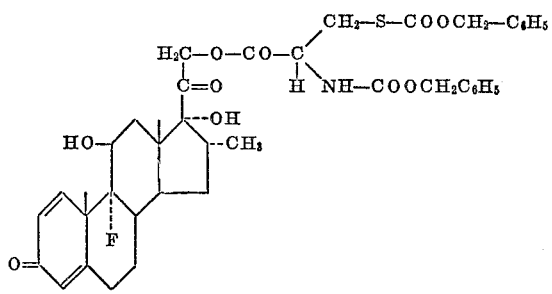

7. A process for the preparation of one of the compounds claimed in claim 1, which process comprises reacting a thio amino acid derivative corresponding to the formula

with an iodo compound corresponding to the following formula

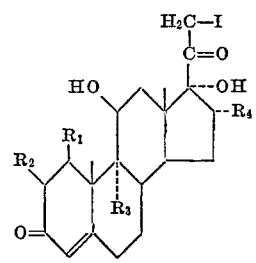

the reaction being carried out in the presence of a hydriodic acid acceptor, wherein R₁, R₂, R₃, R₄ and R₅ are as defined in claim 1.

8. A process according to claim 7, wherein the reaction is carried out in dimethylformamide.

9. A pharmaceutical composition consisting essentially of an inert carrier and a compound of claim 1 as the active ingredient.

10. The pharmaceutical composition of claim 9 wherein the active ingredient is the dexamethasone derivative of claim 6.

No references cited.

ELBERT L. ROBERTS, Primary Examiner

U.S. Cl. X.R.

424—243; 260—112.5